US012750862B2

(12) United States Patent
Kim et al.

(10) Patent No.: US 12,750,862 B2
(45) Date of Patent: Sep. 29, 2026

(54) METHOD AND APPARATUS FOR INITIAL ACCESS USING NON-ORTHOGONAL MULTIPLE ACCESS IN COMMUNICATION NETWORK

(71) Applicant: ELECTRONICS AND TELECOMMUNICATIONS RESEARCH INSTITUTE, Daejeon (KR)

(72) Inventors: Jung Bin Kim, Daejeon (KR); Gyeong Rae Im, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 365 days.

(21) Appl. No.: 18/528,306

(22) Filed: Dec. 4, 2023

(65) Prior Publication Data

US 2024/0188096 A1 Jun. 6, 2024

(30) Foreign Application Priority Data

Dec. 5, 2022 (KR) ........................ 10-2022-0168116
Nov. 16, 2023 (KR) ........................ 10-2023-0159456

(51) Int. Cl.
*H04W 72/232* (2023.01)
*H04L 1/00* (2006.01)
(Continued)

(52) U.S. Cl.
CPC ......... *H04W 72/232* (2023.01); *H04L 1/0003* (2013.01); *H04L 5/0005* (2013.01);
(Continued)

(58) Field of Classification Search
CPC ........... H04W 72/232; H04W 72/0473; H04W 72/1273; H04W 74/0833; H04L 1/0003; H04L 5/0005
See application file for complete search history.

(56) References Cited

U.S. PATENT DOCUMENTS 10,003,486 B2 6/2018 Zhu et al.
10,985,880 B2 4/2021 Lei et al.
(Continued)

FOREIGN PATENT DOCUMENTS

KR 1020170100188 A 9/2017
KR 1020200082319 A 7/2020

OTHER PUBLICATIONS

3Gpp, "3rd Generation Partnership Project; Technical Specification Group Radio Access Network; Study on Non-Orthogonal Multiple Access (NOMA) for NR (Release 16)", TR 38.812 V16.0.0 (Dec. 2018).

(Continued)

*Primary Examiner* — Michael A Keller
*Assistant Examiner* — Chhian (Amy) Ling
(74) *Attorney, Agent, or Firm* — Rabin & Berdo, P.C.

(57) ABSTRACT

A method of a base station may comprise: receiving a signal including a first message of a first terminal and a first message of a second terminal in one RO; determining the first terminal as a near terminal based on preconfigured criteria; determining the second terminal as a far terminal based on the preconfigured criteria; transmitting, to the first terminal and the second terminal, one or more DCIs including a NOMA indicator indicating that second messages, which are responses to the first messages of the first terminal and the second terminal, are to be respectively transmitted in a NOMA scheme; and transmitting the second messages to the first terminal and the second terminal based on the one or more DCIs.

20 Claims, 5 Drawing Sheets

(51) Int. Cl.

| | |
|---|---|
| ***H04L 5/00*** | (2006.01) |
| ***H04W 72/044*** | (2023.01) |
| ***H04W 72/1273*** | (2023.01) |
| ***H04W 74/0833*** | (2024.01) |

(52) U.S. Cl.

CPC ... *H04W 72/0473* (2013.01); *H04W 72/1273* (2013.01); *H04W 74/0833* (2013.01)

(56) References Cited

U.S. PATENT DOCUMENTS

| | | | | |
|---|---|---|---|---|
| 11,039,399 | B2 | 6/2021 | Lei et al. | |
| 11,245,499 | B2 | 2/2022 | Lei et al. | |
| 2015/0312074 | A1* | 10/2015 | Zhu | H04L 5/0046 370/329 |
| 2015/0351081 | A1* | 12/2015 | Zhu | H04J 11/003 370/329 |
| 2016/0066345 | A1* | 3/2016 | Sun | H04J 11/004 370/329 |
| 2017/0251462 | A1* | 8/2017 | Chae | H04B 7/0613 |
| 2017/0289921 | A1* | 10/2017 | Kim | H04W 52/242 |
| 2020/0288505 | A1 | 9/2020 | Tsoukaneri et al. | |
| 2021/0105826 | A1 | 4/2021 | Park et al. | |
| 2021/0111772 | A1 | 4/2021 | Lee et al. | |
| 2021/0135825 | A1* | 5/2021 | Pan | H04L 5/0037 |
| 2021/0266124 | A1* | 8/2021 | Wu | H04W 74/08 |
| 2022/0094413 | A1 | 3/2022 | Park et al. | |
| 2022/0150845 | A1 | 5/2022 | Lei et al. | |

OTHER PUBLICATIONS

Qualcomm Incorporated, 3GPP, 3rd Generation Partnership Project, Technical Specification Group Radio Acess Network, “Procedures Related to NOMA”, TSG RAN WG1 Meeting #94 R1-1809436Gothenburg, Sweden, Aug. 20-24, 2018.

Samsung, 3GPP, 3rd Generation Partnership Project, Techical Specification Group Radio Acess Network, “Discussion on NoMA related procedure”, TSG RAN WG1 Meeting #94 R1-1808762, Gothenburg, Sweden, Aug. 20-24, 2018.

* cited by examiner

METHOD AND APPARATUS FOR INITIAL ACCESS USING NON-ORTHOGONAL MULTIPLE ACCESS IN COMMUNICATION NETWORK

CROSS-REFERENCE TO RELATED APPLICATIONS

This application claims priority to Korean Patent Applications No. 10-2022-0168116, filed on Dec. 5, 2022, and No. 10-2023-0159456, filed on Nov. 16, 2023, with the Korean Intellectual Property Office (KIPO), the entire contents of which are hereby incorporated by reference.

BACKGROUND

1. Technical Field

Exemplary embodiments of the present disclosure relate to an initial access technique, and more specifically, to an initial access technique based on non-orthogonal multiple access (NOMA).

2. Related Art

The communication system (e.g. a new radio (NR) communication system) using a higher frequency band (e.g. a frequency band of 6 GHz or above) than a frequency band (e.g. a frequency band of 6 GHz or below) of the long term evolution (LTE) communication system (or, LTE-A communication system) is being considered for processing of soaring wireless data. The NR system may support not only a frequency band of 6 GHz or below, but also a frequency band of 6 GHz or above, and may support various communication services and scenarios compared to the LTE system. In addition, requirements of the NR system may include enhanced Mobile BroadBand (eMBB), Ultra Reliable Low Latency Communication (URLLC), and Massive Machine Type Communication (mMTC).

A communication network (e.g. NR network) may be classified into a terrestrial network and a non-terrestrial network. The non-terrestrial network may be referred to as an NTN. In a terrestrial network, communication services for a terminal may be provided by a base station located on the ground. In a non-terrestrial network, communication services for a terminal may be provided by a communication node (e.g. satellite, base station, unmanned aerial vehicle (UAV), drone, or the like) located in a non-terrestrial location. Communication in the terrestrial network and the non-terrestrial network may be performed based on the NR communication technology.

Meanwhile, a terminal may perform an initial access procedure to connect to a base station. In the initial access procedure, the terminal may transmit a first message (e.g. message 1 (Msg1) or message A (MsgA)) to the base station in a random access channel (RACH) occasion (RO). When a plurality of terminals transmit the same first messages to the base station in the same RO, the base station may fail to decode the first messages of the plurality of terminals. In other words, the base station may not be able to distinguish the first message of each of the plurality of terminals. In this case, the initial access procedure may fail, and connection establishment between the terminal and the base station may be delayed.

SUMMARY

Exemplary embodiments of the present disclosure are directed to providing a method and an apparatus for initial access using non-orthogonal multiple access (NOMA) in a communication network.

According to a first exemplary embodiment of the present disclosure, a method of a base station may comprise: receiving a signal including a first message of a first terminal and a first message of a second terminal in one random access channel (RACH) occasion (RO); determining the first terminal as a near terminal based on preconfigured criteria; determining the second terminal as a far terminal based on the preconfigured criteria; transmitting, to the first terminal and the second terminal, one or more downlink configuration information (DCIs) including a non-orthogonal multiple access (NOMA) indicator indicating that second messages, which are responses to the first messages of the first terminal and the second terminal, are to be respectively transmitted in a NOMA scheme; and transmitting the second messages to the first terminal and the second terminal based on the one or more DCIs.

When a first reception power of the first message of the first terminal is equal to a target reception power, the first terminal may be determined as the near terminal, and when a second reception power of the first message of the second terminal is less than the target reception power, the second terminal may be determined as the far terminal.

When a same transmission power is configured for the first messages of the first terminal and the second terminal, and a first reception power of the first message of the first terminal is greater than a second reception power of the first message of the second terminal, the first terminal may be determined as the near terminal, and the second terminal may be determined as the far terminal.

A number of the one or more DCIs may be 1, and one DCI belonging to the one or more DCIs may further include resource allocation information and a power allocation coefficient for transmission of the second message based on the NOMA scheme.

The transmitting of the second messages to the first terminal and the second terminal based on the one or more DCIs may comprise: transmitting, to the first terminal, the second message using a first transmission power determined based on a value indicated by the power allocation coefficient on a physical downlink shared channel (PDSCH) indicated by the resource allocation information included in the one DCI; and transmitting, to the second terminal, the second message using a second transmission power determined based on (1−the value indicated by the power allocation coefficient) on the PDSCH indicated by the resource allocation information included in the one DCI.

A number of the one or more DCIs may be 2, a first DCI among the one or more DCIs may further include first resource allocation information and a terminal indicator indicating the near terminal, and a second DCI among the one or more DCIs may further include second resource allocation information and a terminal indicator indicating the far terminal.

The transmitting of the second messages to the first terminal and the second terminal based on the one or more DCIs may comprise: transmitting the second message to the first terminal on a first PDSCH indicated by the first resource allocation information included in the first DCI; and transmitting the second message to the second terminal on a second PDSCH indicated by the second resource allocation information included in the second DCI.

A number of the one or more DCIs may be 1, and one DCI belonging to the one or more DCIs may further include common resource allocation information for the near terminal and the far terminal and additional resource allocation information for the far terminal.

The one DCI may further include first modulation and coding scheme (MCS) information for the near terminal and second MCS information for the far terminal.

The transmitting of the second messages to the first terminal and the second terminal based on the one or more DCIs may comprise: transmitting the second message to the first terminal on a first PDSCH indicated by the common resource allocation information included in the one DCI; and transmitting the second message to the second terminal on a second PDSCH indicated by the common resource allocation information and the additional resource allocation information included in the one DCI.

The first message of each of the first terminal and the second terminal may be a Msg1 or MsgA, and the second message may be a Msg2 or MsgB.

According to a second exemplary embodiment of the present disclosure, a method of a terminal may comprise: transmitting a first message to a base station in a random access channel (RACH) occasion (RO); receiving, from the base station, one or more downlink control information (DCIs) for scheduling a second message, which is a response to the first message; in response to that the one or more DCIs include a non-orthogonal multiple access (NOMA) indicator indicating that the second message is to be transmitted based on a NOMA scheme, determining a type of the terminal as a near terminal or a far terminal based on preconfigured criteria; and receiving the second message from the base station based on the determined type.

When the first message is transmitted using a transmission power less than a maximum transmission power, the terminal may be determined as the near terminal, and when the first message is transmitted using a transmission power equal to the maximum transmission power, the terminal may be determined as the far terminal.

When a path loss between the terminal and the base station is less than or equal to a reference path loss, the terminal may be determined as the near terminal, and when the path loss between the terminal and the base station is greater than the reference path loss, the terminal may be determined as the far terminal.

A number of the one or more DCIs may be 1, one DCI belonging to the one or more DCIs may further include resource allocation information and a power allocation coefficient for transmission of the second message based on the NOMA scheme, the second message may be received on a physical downlink shared channel (PDSCH) indicated by the resource allocation information, and the second message may be decoded in consideration of the power allocation coefficient.

A number of the one or more DCIs may be 2, a first DCI among the one or more DCIs may further include first resource allocation information and a terminal indicator indicating the near terminal, a second DCI among the one or more DCIs may further include second resource allocation information and a terminal indicator indicating the far terminal, and the second message may be received based on a DCI corresponding to the determined type among the first DCI and the second DCI.

A number of the one or more DCIs may be 1, one DCI belonging to the one or more DCIs may further include common resource allocation information for the near terminal and the far terminal and additional resource allocation information for the far terminal, the second message may be received on a first PDSCH indicated by the common resource allocation information when the terminal is the near terminal, and the second message may be received on a second PDSCH indicated by the common resource allocation information and the additional resource allocation information when the terminal is the far terminal.

According to a third exemplary embodiment of the present disclosure, a terminal may comprise at least one processor, and the at least one processor may cause the terminal to perform: transmitting a first message to a base station in a random access channel (RACH) occasion (RO); receiving, from the base station, one or more downlink control information (DCIs) for scheduling a second message, which is a response to the first message; in response to that the one or more DCIs include a non-orthogonal multiple access (NOMA) indicator indicating that the second message is to be transmitted based on a NOMA scheme, determining a type of the terminal as a near terminal or a far terminal based on preconfigured criteria; and receiving the second message from the base station based on the determined type.

When the first message is transmitted using a transmission power less than a maximum transmission power, the terminal may be determined as the near terminal, and when the first message is transmitted using a transmission power equal to the maximum transmission power, the terminal may be determined as the far terminal.

A number of the one or more DCIs may be 1, one DCI belonging to the one or more DCIs may further include resource allocation information and a power allocation coefficient for transmission of the second message based on the NOMA scheme, the second message may be received on a physical downlink shared channel (PDSCH) indicated by the resource allocation information, and the second message may be decoded in consideration of the power allocation coefficient.

According to the present disclosure, a non-orthogonal multiple access (NOMA)-based initial access procedure can be performed. In this case, a base station can distinguish the same first messages (e.g. Msg1 or MsgA) received from terminals, and transmit a second message (e.g. Msg2 or MsgB) for the same first message to each terminal. Through the above-described operation, the issue of collisions between terminals in the initial access procedure can be resolved, leading to a reduction in the delay during the access procedure (e.g. connection establishment) between the terminal and the base station. In other words, multiple terminals can support low-latency access operations. The methods (e.g. exemplary embodiments) proposed in the present disclosure may be particularly effective in situations where collisions between terminals are frequent during the initial access procedure performed in an environment with a large number of terminals.

DETAILED DESCRIPTION OF THE EMBODIMENTS

Figure 1:
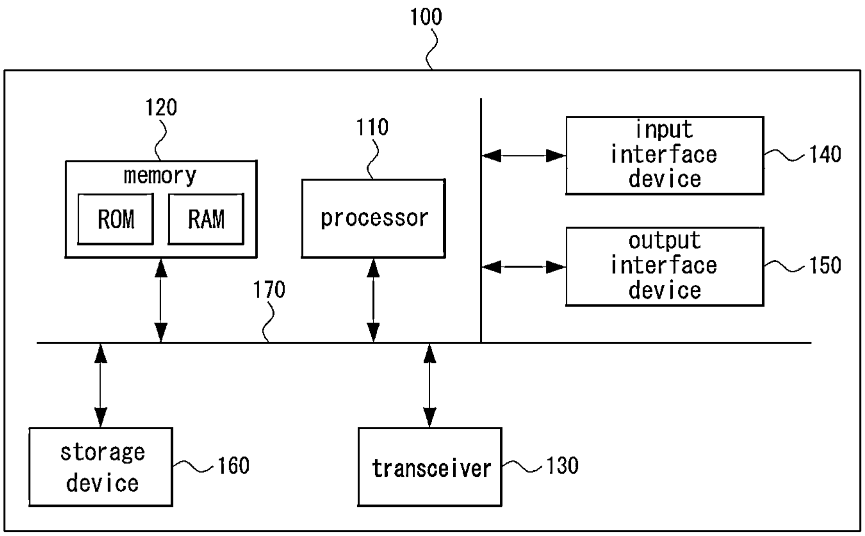
FIG. 1 is a block diagram illustrating a first exemplary embodiment of a communication node in a communication network.

Exemplary embodiments of the present disclosure are disclosed herein. However, specific structural and functional details disclosed herein are merely representative for purposes of describing embodiments of the present disclosure. Thus, embodiments of the present disclosure may be embodied in many alternate forms and should not be construed as limited to embodiments of the present disclosure set forth herein.

Accordingly, while the present disclosure is capable of various modifications and alternative forms, specific embodiments thereof are shown by way of example in the drawings and will herein be described in detail. It should be understood, however, that there is no intent to limit the present disclosure to the particular forms disclosed, but on the contrary, the present disclosure is to cover all modifications, equivalents, and alternatives falling within the spirit and scope of the present disclosure. Like numbers refer to like elements throughout the description of the figures.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of the present disclosure. As used herein, the term “and/or” includes any and all combinations of one or more of the associated listed items.

In exemplary embodiments of the present disclosure, “at least one of A and B” may mean “at least one of A or B” or “at least one of combinations of one or more of A and B”. Also, in exemplary embodiments of the present disclosure, “one or more of A and B” may mean “one or more of A or B” or “one or more of combinations of one or more of A and B”.

It will be understood that when an element is referred to as being “connected” or “coupled” to another element, it can be directly connected or coupled to the other element or intervening elements may be present. In contrast, when an element is referred to as being “directly connected” or “directly coupled” to another element, there are no intervening elements present. Other words used to describe the relationship between elements should be interpreted in a like fashion (i.e. “between” versus “directly between,” “adjacent” versus “directly adjacent,” etc.).

The terminology used herein is for the purpose of describing particular embodiments only and is not intended to be limiting of the present disclosure. As used herein, the singular forms “a,” “an” and “the” are intended to include the plural forms as well, unless the context clearly indicates otherwise. It will be further understood that the terms “comprises,” “comprising,” “includes” and/or “including,” when used herein, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this present disclosure belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Hereinafter, exemplary embodiments of the present disclosure will be described in greater detail with reference to the accompanying drawings. In order to facilitate general understanding in describing the present disclosure, the same components in the drawings are denoted with the same reference signs, and repeated description thereof will be omitted.

A communication system to which exemplary embodiments according to the present disclosure are applied will be described. The communication system may be the 4G communication system (e.g. Long-Term Evolution (LTE) communication system or LTE-A communication system), the 5G communication system (e.g. New Radio (NR) communication system), the sixth generation (6G) communication system, or the like. The 4G communication system may support communications in a frequency band of 6 GHz or below, and the 5G communication system may support communications in a frequency band of 6 GHz or above as well as the frequency band of 6 GHz or below. The communication network may include a terrestrial network and a non-terrestrial network. The communication system to which the exemplary embodiments according to the present disclosure are applied is not limited to the contents described below, and the exemplary embodiments according to the present disclosure may be applied to various communication systems. Here, the communication system may be used in the same sense as a communication network, ‘LTE’ may refer to ‘4G communication system’, ‘LTE communication system’, or ‘LTE-A communication system’, and ‘NR’ may refer to ‘5G communication system’ or ‘NR communication system’.

In exemplary embodiments, “an operation (e.g. transmission operation) is configured” may mean that “configuration information (e.g. information element(s) or parameter(s)) for the operation and/or information indicating to perform the operation is signaled”. “Information element(s) (e.g. parameter(s)) are configured” may mean that “corresponding information element(s) are signaled”. In other words, “an operation (e.g. transmission operation) is configured in a communication node” may mean that the communication node receives “configuration information (e.g. information elements, parameters) for the operation” and/or “information indicating to perform the operation”. “An information element (e.g. parameter) is configured in a communication node” may mean that “the information element is signaled to the communication node (e.g. the communication node receives the information element)”.

The signaling may be at least one of system information (SI) signaling (e.g. transmission of system information block (SIB) and/or master information block (MIB)), RRC signaling (e.g. transmission of RRC parameters and/or higher layer parameters), MAC control element (CE) signaling, or PHY signaling (e.g. transmission of downlink control information (DCI), uplink control information (UCI), and/or sidelink control information (SCI)). A signaling message may be at least one of an SI signaling message (e.g. SI message), an RRC signaling message (e.g. RRC message), a MAC CE signaling message (e.g. MAC CE message or MAC message), or a PHY signaling message (e.g. PHY message).

Hereinafter, even when a method (e.g. transmission or reception of a signal) performed at a first communication node among communication nodes is described, a corresponding second communication node may perform a method (e.g. reception or transmission of the signal) corresponding to the method performed at the first communication node. That is, when an operation of a terminal is described, a base station corresponding to the terminal may perform an operation corresponding to the operation of the terminal. Conversely, when an operation of a base station is described, a terminal corresponding to the base station may perform an operation corresponding to the operation of the base station. In addition, when an operation of a first terminal is described, a second terminal corresponding to the first terminal may perform an operation corresponding to the operation of the first terminal. Conversely, when an operation of a second terminal is described, a first terminal corresponding to the second terminal may perform an operation corresponding to the operation of the second terminal.

FIG. 1 is a block diagram illustrating a first exemplary embodiment of a communication node in a communication network.

Referring to FIG. 1, a communication 100 may perform communication in a communication network. The communication node 100 may comprise at least one processor 110, a memory 120, and a transceiver 130 connected to the network for performing communications. Also, the communication node 100 may further comprise an input interface device 140, an output interface device 150, a storage device 160, and the like. Each component included in the communication node 100 may communicate with each other as connected through a bus 170.

However, each component included in the communication node 100 may not be connected to the common bus 170 but may be connected to the processor 110 via an individual interface or a separate bus. For example, the processor 110 may be connected to at least one of the memory 120, the transceiver 130, the input interface device 140, the output interface device 150 and the storage device 160 via a dedicated interface.

The processor 110 may execute a program stored in at least one of the memory 120 and the storage device 160. The processor 110 may refer to a central processing unit (CPU), a graphics processing unit (GPU), or a dedicated processor on which methods in accordance with embodiments of the present disclosure are performed. Each of the memory 120 and the storage device 160 may be constituted by at least one of a volatile storage medium and a non-volatile storage medium. For example, the memory 120 may comprise at least one of read-only memory (ROM) and random access memory (RAM).

Figure 2:
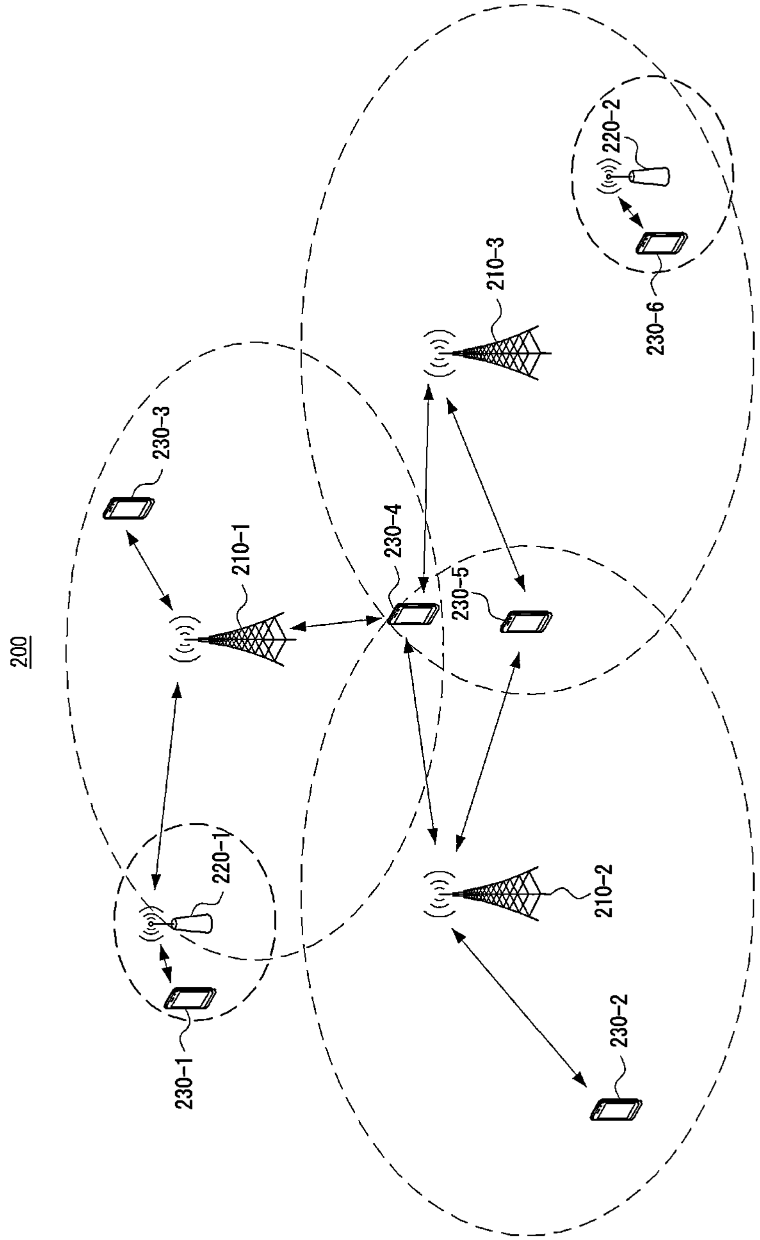
FIG. 2 is a conceptual diagram illustrating a first exemplary embodiment of a communication network.

FIG. 2 is a conceptual diagram illustrating a first exemplary embodiment of a communication network.

Referring to FIG. 2, a communication network 200 may be a terrestrial network. The communication system 200 may comprise a plurality of communication nodes 210-1, 210-2, 210-3, 220-1, 220-2, 230-1, 230-2, 230-3, 230-4, 230-5, and 230-6. In addition, the communication system 200 may further comprise a core network (e.g. a serving gateway (S-GW), a packet data network (PDN) gateway (P-GW), and a mobility management entity (MME)). When the communication system 200 is a 5G communication system (e.g. new radio (NR) system), the core network may include an access and mobility management function (AMF), a user plane function (UPF), a session management function (SMF), and the like.

The plurality of communication nodes 210 to 230 may support a communication protocol defined by the 3rd generation partnership project (3GPP) specifications (e.g. LTE communication protocol, LTE-A communication protocol, NR communication protocol, or the like). The plurality of communication nodes 210 to 230 may support code division multiple access (CDMA) technology, wideband CDMA (WCDMA) technology, time division multiple access (TDMA) technology, frequency division multiple access (FDMA) technology, orthogonal frequency division multiplexing (OFDM) technology, filtered OFDM technology, cyclic prefix OFDM (CP-OFDM) technology, discrete Fourier transform-spread-OFDM (DFT-s-OFDM) technology, orthogonal frequency division multiple access (OFDMA) technology, single carrier FDMA (SC-FDMA) technology, non-orthogonal multiple access (NOMA) technology, generalized frequency division multiplexing (GFDM) technology, filter band multi-carrier (FBMC) technology, universal filtered multi-carrier (UFMC) technology, space division multiple access (SDMA) technology, or the like. Each of the plurality of communication nodes may have the following structure.

The communication system 200 may comprise a plurality of base stations 210-1, 210-2, 210-3, 220-1, and 220-2, and a plurality of terminals 230-1, 230-2, 230-3, 230-4, 230-5, and 230-6. Each of the first base station 210-1, the second base station 210-2, and the third base station 210-3 may form a macro cell, and each of the fourth base station 220-1 and the fifth base station 220-2 may form a small cell. The fourth base station 220-1, the third terminal 230-3, and the fourth terminal 230-4 may belong to cell coverage of the first base station 210-1. Also, the second terminal 230-2, the fourth terminal 230-4, and the fifth terminal 230-5 may belong to cell coverage of the second base station 210-2. Also, the fifth base station 220-2, the fourth terminal 230-4, the fifth terminal 230-5, and the sixth terminal 230-6 may belong to cell coverage of the third base station 210-3. Also, the first terminal 230-1 may belong to cell coverage of the fourth base station 220-1, and the sixth terminal 230-6 may belong to cell coverage of the fifth base station 220-2.

Here, each of the plurality of base stations 210-1, 210-2, 210-3, 220-1, and 220-2 may refer to a Node-B (NB), a evolved Node-B (eNB), a gNB, an advanced base station (ABS), a high reliability-base station (HR-BS), a base transceiver station (BTS), a radio base station, a radio transceiver, an access point, an access node, a radio access station (RAS), a mobile multihop relay-base station (MMR-BS), a relay station (RS), an advanced relay station (ARS), a high reliability-relay station (HR-RS), a home NodeB (HNB), a home eNodeB (HeNB), a road side unit (RSU), a radio remote head (RRH), a transmission point (TP), a transmission and reception point (TRP), or the like.

Each of the plurality of terminals 230-1, 230-2, 230-3, 230-4, 230-5, and 230-6 may refer to a user equipment (UE), a terminal equipment (TE), an advanced mobile station (AMS), a high reliability-mobile station (HR-MS), a terminal, an access terminal, a mobile terminal, a station, a subscriber station, a mobile station, a portable subscriber station, a node, a device, an on-board unit (OBU), or the like.

Each of the plurality of base stations 210-1, 210-2, 210-3, 220-1, and 220-2 may operate in the same frequency band or in different frequency bands. The plurality of base stations 210-1, 210-2, 210-3, 220-1, and 220-2 may be connected to each other via an ideal backhaul or a non-ideal backhaul, and exchange information with each other via the ideal or non-ideal backhaul. Also, each of the plurality of base stations 210-1, 210-2, 210-3, 220-1, and 220-2 may be connected to the core network through the ideal or non-ideal backhaul. Each of the plurality of base stations 210-1, 210-2, 210-3, 220-1, and 220-2 may transmit a signal received from the core network to the corresponding terminal 230-1, 230-2, 230-3, 230-4, 230-5, or 230-6, and transmit a signal received from the corresponding terminal 230-1, 230-2, 230-3, 230-4, 230-5, or 230-6 to the core network.

In addition, each of the plurality of base stations 210-1, 210-2, 210-3, 220-1, and 220-2 may support a multi-input multi-output (MIMO) transmission (e.g. a single-user MIMO (SU-MIMO), a multi-user MIMO (MU-MIMO), a massive MIMO, or the like), a coordinated multipoint (CoMP) transmission, a carrier aggregation (CA) transmission, a transmission in unlicensed band, device-to-device (D2D) communication (or, proximity services (ProSe)), Internet of Things (IOT) communications, dual connectivity (DC), or the like. Here, each of the plurality of terminals 230-1, 230-2, 230-3, 230-4, 230-5, and 230-6 may perform operations corresponding to the operations of the plurality of base stations 210-1, 210-2, 210-3, 220-1, and 220-2 (i.e. the operations supported by the plurality of base stations 210-1, 210-2, 210-3, 220-1, and 220-2). For example, the second base station 210-2 may transmit a signal to the fourth terminal 230-4 in the SU-MIMO manner, and the fourth terminal 230-4 may receive the signal from the second base station 210-2 in the SU-MIMO manner. Alternatively, the second base station 210-2 may transmit a signal to the fourth terminal 230-4 and fifth terminal 230-5 in the MU-MIMO manner, and the fourth terminal 230-4 and fifth terminal 230-5 may receive the signal from the second base station 210-2 in the MU-MIMO manner.

The first base station 210-1, the second base station 210-2, and the third base station 210-3 may transmit a signal to the fourth terminal 230-4 in the COMP transmission manner, and the fourth terminal 230-4 may receive the signal from the first base station 210-1, the second base station 210-2, and the third base station 210-3 in the COMP manner. Also, each of the plurality of base stations 210-1, 210-2, 210-3, 220-1, and 220-2 may exchange signals with the corresponding terminals 230-1, 230-2, 230-3, 230-4, 230-5, or 230-6 which belongs to its cell coverage in the CA manner. Each of the base stations 210-1, 210-2, and 210-3 may control D2D communications between the fourth terminal 230-4 and the fifth terminal 230-5, and thus the fourth terminal 230-4 and the fifth terminal 230-5 may perform the D2D communications under control of the second base station 210-2 and the third base station 210-3.

Figure 3:
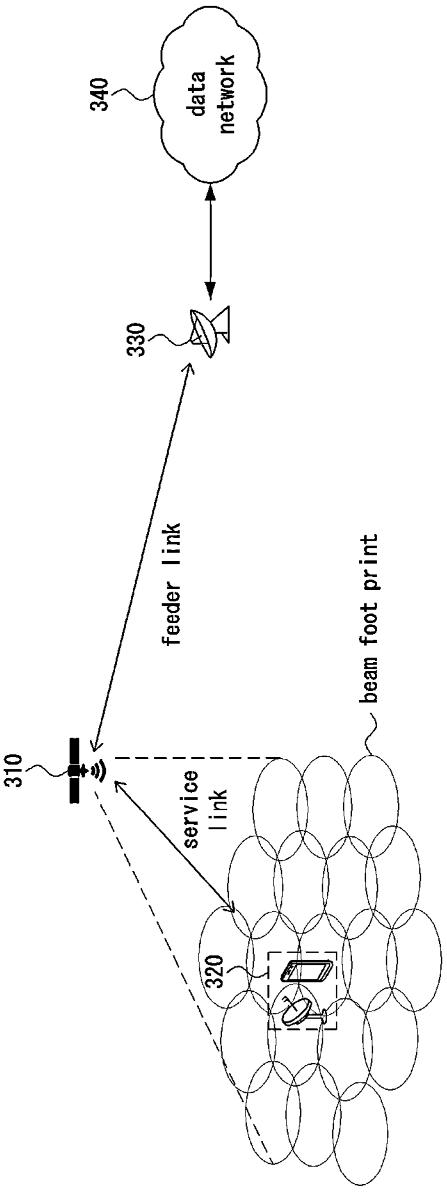
FIG. 3 is a conceptual diagram illustrating a second exemplary embodiment of a communication network.

FIG. 3 is a conceptual diagram illustrating a second exemplary embodiment of a communication network.

Referring to FIG. 3, a communication network may be a non-terrestrial network (NTN). The NTN may include a satellite 310, a communication node 320, a gateway 330, a data network 340, and the like. The NTN shown in FIG. 3 may be an NTN based on a transparent payload. The satellite 310 may be a low earth orbit (LEO) satellite, a medium earth orbit (MEO) satellite, a geostationary earth orbit (GEO) satellite, a high elliptical orbit (HEO) satellite, or an unmanned aircraft system (UAS) platform. The UAS platform may include a high altitude platform station (HAPS).

The communication node 320 may include a communication node (e.g. a user equipment (UE) or a terminal) located on a terrestrial site and a communication node (e.g. an airplane, a drone) located on a non-terrestrial space. A service link may be established between the satellite 310 and the communication node 320, and the service link may be a radio link. The satellite 310 may provide communication services to the communication node 320 using one or more beams. The shape of a footprint of the beam of the satellite 310 may be elliptical.

The communication node 320 may perform communications (e.g. downlink communication and uplink communication) with the satellite 310 using LTE technology and/or NR technology. The communications between the satellite 310 and the communication node 320 may be performed using an NR-Uu interface. When dual connectivity (DC) is supported, the communication node 320 may be connected to other base stations (e.g. base stations supporting LTE and/or NR functionality) as well as the satellite 310, and perform DC operations based on the techniques defined in the LTE and/or NR specifications.

The gateway 330 may be located on a terrestrial site, and a feeder link may be established between the satellite 310 and the gateway 330. The feeder link may be a radio link. The gateway 330 may be referred to as a 'non-terrestrial network (NTN) gateway'. The communications between the satellite 310 and the gateway 330 may be performed based on an NR-Uu interface or a satellite radio interface (SRI). The gateway 330 may be connected to the data network 340. There may be a 'core network' between the gateway 330 and the data network 340. In this case, the gateway 330 may be connected to the core network, and the core network may be connected to the data network 340. The core network may support the NR technology. For example, the core network may include an access and mobility management function (AMF), a user plane function (UPF), a session management function (SMF), and the like. The communications between the gateway 330 and the core network may be performed based on an NG-C/U interface.

Alternatively, a base station and the core network may exist between the gateway 330 and the data network 340. In this case, the gateway 330 may be connected with the base station, the base station may be connected with the core network, and the core network may be connected with the data network 340. The base station and core network may support the NR technology. The communications between the gateway 330 and the base station may be performed based on an NR-Uu interface, and the communications between the base station and the core network (e.g. AMF, UPF, SMF, and the like) may be performed based on an NG-C/U interface.

Figure 4:
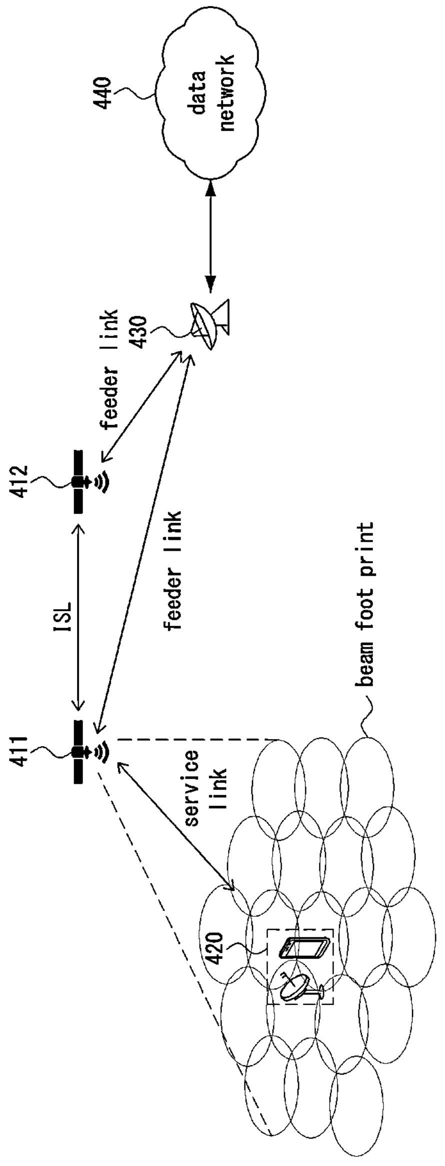
FIG. 4 is a conceptual diagram illustrating a third exemplary embodiment of a communication network.

FIG. 4 is a conceptual diagram illustrating a third exemplary embodiment of a communication network.

Referring to FIG. 4, a communication network may be an NTN. The NTN may include a first satellite 411, a second satellite 412, a communication node 420, a gateway 430, a data network 440, and the like. The NTN shown in FIG. 4 may be a regenerative payload based NTN. For example, each of the satellites 411 and 412 may perform a regenerative operation (e.g. demodulation, decoding, re-encoding, re-modulation, and/or filtering operation) on a payload received from other entities (e.g. the communication node 420 or the gateway 430), and transmit the regenerated payload.

Each of the satellites 411 and 412 may be a LEO satellite, a MEO satellite, a GEO satellite, a HEO satellite, or a UAS platform. The UAS platform may include a HAPS. The satellite 411 may be connected to the satellite 412, and an inter-satellite link (ISL) may be established between the satellite 411 and the satellite 412. The ISL may operate in an RF frequency band or an optical band. The ISL may be established optionally. The communication node 420 may include a terrestrial communication node (e.g. UE or terminal) and a non-terrestrial communication node (e.g. airplane or drone). A service link (e.g. radio link) may be established between the satellite 411 and communication node 420. The satellite 411 may provide communication services to the communication node 420 using one or more beams.

The communication node 420 may perform communications (e.g. downlink communication or uplink communication) with the satellite 411 using LTE technology and/or NR technology. The communications between the satellite 411 and the communication node 420 may be performed using an NR-Uu interface. When DC is supported, the communication node 420 may be connected to other base stations (e.g. base stations supporting LTE and/or NR functionality) as well as the satellite 411, and may perform DC operations based on the techniques defined in the LTE and/or NR specifications.

The gateway 430 may be located on a terrestrial site, a feeder link may be established between the satellite 411 and the gateway 430, and a feeder link may be established between the satellite 412 and the gateway 430. The feeder link may be a radio link. When the ISL is not established between the satellite 411 and the satellite 412, the feeder link between the satellite 411 and the gateway 430 may be established mandatorily.

The communications between each of the satellites 411 and 412 and the gateway 430 may be performed based on an NR-Uu interface or an SRI. The gateway 430 may be connected to the data network 440. There may be a core network between the gateway 430 and the data network 440. In this case, the gateway 430 may be connected to the core network, and the core network may be connected to the data network 440. The core network may support the NR technology. For example, the core network may include AMF, UPF, SMF, and the like. The communications between the gateway 430 and the core network may be performed based on an NG-C/U interface.

Alternatively, a base station and the core network may exist between the gateway 430 and the data network 440. In this case, the gateway 430 may be connected with the base station, the base station may be connected with the core network, and the core network may be connected with the data network 440. The base station and the core network may support the NR technology. The communications between the gateway 430 and the base station may be performed based on an NR-Uu interface, and the communications between the base station and the core network (e.g. AMF, UPF, SMF, and the like) may be performed based on an NG-C/U interface.

NTN reference scenarios may be defined as shown in Table 1 below.

TABLE 1

| | NTN shown in FIG. 3 | NTN shown in FIG. 4 |
|---|---|---|
| GEO | Scenario A | Scenario B |
| LEO (steerable beams) | Scenario C1 | Scenario D1 |
| LEO (beams moving with satellite) | Scenario C2 | Scenario D2 |

When the satellite 310 in the NTN shown in FIG. 3 is a GEO satellite (e.g. a GEO satellite that supports a transparent function), this may be referred to as 'scenario A'. When the satellites 411 and 412 in the NTN shown in FIG. 4 are GEO satellites (e.g. GEOs that support a regenerative function), this may be referred to as 'scenario B'.

When the satellite 310 in the NTN shown in FIG. 3 is an LEO satellite with steerable beams, this may be referred to as 'scenario C1'. When the satellite 310 in the NTN shown in FIG. 3 is an LEO satellite having beams moving with the satellite, this may be referred to as 'scenario C2'. When the satellites 411 and 412 in the NTN shown in FIG. 4 are LEO satellites with steerable beams, this may be referred to as 'scenario D1'. When the satellites 411 and 412 in the NTN shown in FIG. 4 are LEO satellites having beams moving with the satellites, this may be referred to as 'scenario D2'.

Parameters for the scenarios defined in Table 1 may be defined as shown in Table 2 below.

TABLE 2

| | Scenarios A and B | Scenarios C and D |
|---|---|---|
| Altitude | 35,786 km | 600 km<br>1,200 km |
| Spectrum (service link) | <6 GHz (e.g. 2 GHz)<br>>6 GHz (e.g. DL 20 GHz, UL 30 GHz) | |
| Maximum channel bandwidth capability (service link) | 30 MHz for band <6 GHz<br>1 GHz for band >6 GHz | |
| Maximum distance between satellite and communication node (e.g. UE) at the minimum elevation angle | 40,581 km | 1,932 km (altitude of 600 km)<br>3,131 km (altitude of 1,200 km) |
| Maximum round trip delay (RTD) (only propagation delay) | Scenario A: 541.46 ms (service and feeder links)<br>Scenario B: 270.73 ms (only service link) | Scenario C: (transparent payload: service and feeder links)<br>−5.77 ms (altitude of 60 0 km)<br>−41.77 ms (altitude of 1,200 km)<br>Scenario D: (regenerative payload: only service link)<br>−12.89 ms (altitude of 600 km)<br>−20.89 ms (altitude of 1,200 km) |
| Maximum differential delay within a cell | 10.3 ms | 3.12 ms (altitude of 600 km)<br>3.18 ms (altitude of 1,200 km) |
| Service link | NR defined in 3GPP | |
| Feeder link | Radio interfaces defined in 3GPP or non-3GPP | |

In addition, in the scenarios defined in Table 1, delay constraints may be defined as shown in Table 3 below.

TABLE 3

| | Scenario A | Scenario B | Scenario C1-2 | Scenario D1-2 |
|---|---|---|---|---|
| Satellite altitude | 35,786 km | | 600 km | |
| Maximum RTD in a radio interface between base station and UE | 541.75 ms (worst case) | 270.57 ms | 28.41 ms | 12.88 ms |
| Minimum RTD in a radio interface between base station and UE | 477.14 ms | 238.57 ms | 8 ms | 4 ms |

Meanwhile, a terminal may perform an initial access procedure with a base station. The initial access procedure may be classified into a 4-step random access (RA) procedure and a 2-step RA procedure. In the present disclosure, exemplary embodiments will be described focusing on the 4-step RA procedure, but exemplary embodiments of the present disclosure are applicable to the 2-step RA procedure as well as the 4-step RA procedure. In addition, exemplary embodiments in the present disclosure will be described focusing on operations of two terminals simultaneously performing the initial access procedures, but exemplary embodiments of the present disclosure may also be applied to operations of three or more terminals simultaneously performing the initial access procedures.

When a terminal is turned on, the terminal may perform a cell search procedure. For example, the terminal may receive a synchronization signal/physical broadcast channel (SS/PBCH) block from the base station and acquire time synchronization and/or frequency synchronization of a cell based on the SS/PBCH block. In addition, the terminal may obtain a physical cell identifier (PCI) and/or a master information block (MIB) from the SS/PBCH block. The SS/PBCH block may be referred to as a synchronization signal block (SSB).

The terminal may receive a physical downlink control channel (PDCCH) in a control resource set (CORESET) and a search space indicated by PDCCH-ConfigSIB1 included in the MIB. Depending on a context, a PDCCH may be interpreted as downlink control information (DCI) or a channel (e.g. resource) through which the DCI is transmitted and received. The terminal may receive a physical downlink shared channel (PDSCH) indicated (e.g. scheduled) by the PDCCH, and obtain a system information block 1 (SIB1) from the PDSCH. Depending on a context, a PDSCH may be interpreted as data (e.g. data unit) or a channel (e.g. resource) through which the data is transmitted and received.

The terminal may perform an initial access procedure (e.g. random access (RA) procedure) based on information element(s) included in the SIB1 (e.g. RACH-ConfigCommon, RACH-ConfigCommon TwoStepRA, RACH-ConfigGeneric, RACH-ConfigGeneric TwoStepRA). The MIB may include information on a subcarrier spacing (SCS) (e.g. subCarrierSpacingCommon) of the SIB1 and PDCCH configuration information of the SIB1 (e.g. PDCCH-ConfigSIB1). The SIB1 may include a public land mobile network (PLMN) identifier, cell selection parameters, and/or RACH parameters. In the present disclosure, a parameter may refer to an information element, configuration information, or the like.

Figure 5:
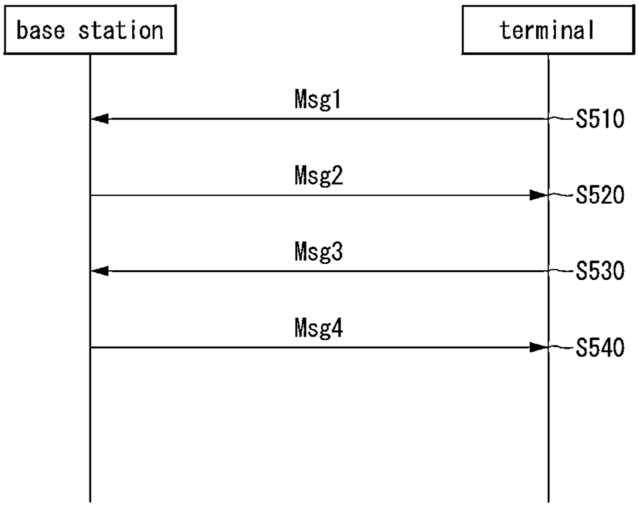
FIG. 5 is a sequence chart illustrating a first exemplary embodiment of an initial access procedure.

FIG. 5 is a sequence chart illustrating a first exemplary embodiment of an initial access procedure.

Referring to FIG. 5, the terminal may receive the SIB1 from the base station and identify RACH configuration information included in the SIB1. The terminal may identify a RACH resource (e.g. RACH occasion (RO)) based on the RACH configuration information. The terminal may transmit a message 1 (Msg1) (or message A (MsgA)) in the RO (S510). The step S510 may be a first step of the initial access procedure. The Msg1 and/or MsgA may be referred to as a first message. In other words, the first message may refer to the Msg1 and/or MsgA. The first message may include an RA preamble. The RA preamble may be referred to as a PRACH preamble. The terminal may calculate a radio network temporary identifier (RA-RNTI) using information on a resource through which the first message is transmitted (e.g. time resource information of the RO, frequency resource information of the RO).

The base station may receive the first message (e.g. Msg1 or MsgA) from the terminal, and transmit a second message (e.g. message 2 (Msg2) or message B (MsgB)) to the terminal in response to the first message (S520). The step S520 may be a second step of the initial access procedure. The second message may be referred to as a random access response (RAR). The Msg2 and/or MsgB may be referred to as a second message (e.g. RAR). The base station may transmit the second message to the terminal using a PDCCH and a PDSCH. For example, the base station may transmit a DCI with a cyclic redundancy check (CRC) scrambled by the RA-RNTI to the terminal on a PDCCH, and transmit the second message to the terminal on a PDSCH scheduled by the DCI. Here, the base station may calculate the RA-RNTI based on information on a resource of the RO in which the first message of the terminal is received. The terminal may detect the DCI transmitted from the base station using the RA-RNTI, receive the second message from the base station on the PDSCH scheduled by the DCI, and identify information element(s) included in the second message. The second message may include a random access preamble index (RAPID), a timing advance (TA) command, an uplink (UL) grant, and/or a temporary cell (TC)-RNTI.

When the RAPID included in the second message is the same as an RAPID of the first message transmitted in the step S510, the terminal may transmit a message 3 (Msg3) to the base station by using a resource (e.g. physical uplink shared channel (PUSCH)) indicated by the UL grant included in the second message (S530). The step S530 may be a third step of the initial access procedure. The Msg3 may be referred to as a third message. The third message may be a radio resource control (RRC) connection request message. In other words, the third message may include information element(s) for RRC connection request.

The base station may receive the third message from the terminal through the resource indicated by the UL grant included in the second message. The base station may generate a message 4 (Msg4) in response to the third message, and transmit the Msg4 to the terminal (S540). The step S540 may be a fourth step of the initial access procedure. The Msg4 may be referred to as a fourth message. The fourth message may be an RRC connection setup message. In other words, the fourth message may include information element(s) for RRC connection setup. The base station may transmit the fourth message to the terminal using a PDCCH and a PDSCH. For example, the base station may transmit a DCI with a CRC scrambled by the TC-RNTI (e.g. TC-RNTI included in the Msg2) to the terminal on a PDCCH, and transmit the fourth message to the terminal on a PDSCH scheduled by the DCI. The terminal may detect the DCI transmitted from the base station using the TC-RNTI, receive the fourth message from the base station on the PDSCH scheduled by the DCI, and identify information element(s) included in the fourth message.

When decoding of the fourth message is successful, the terminal may set the TC-RNTI as a cell (C)-RNTI and complete the access procedure for the base station (e.g. initial access procedure, RA procedure, connection procedure). In addition, the terminal may transmit a hybrid automatic repeat request (HARQ)-acknowledgement (ACK) for the fourth message to the base station. When the HARQ-ACK for the fourth message is received from the terminal, the base station may determine that the initial access procedure for the terminal has been completed. On the other hand, when decoding of the fourth message fails and a contention resolution timer expires, the terminal may consider reception of the fourth message to have failed. In this case, the terminal may perform the RA procedure again.

Meanwhile, in the cell selection procedure (e.g. cell search procedure), in order to transmit the SIB1, the base station may transmit a DCI (e.g. DCI format 1_0) with a CRC scrambled by a system information (SI)-RNTI to the terminal on a PDCCH, and transmit the SIB1 to the terminal on a PDSCH scheduled by the DCI. The terminal may detect the DCI transmitted from the base station by using the SI-RNTI, receive the SIB1 from the base station on the PDSCH scheduled by the DCI, and identify information element(s) included in the SIB1. The DCI format 1_0 with a CRC scrambled by the SI-RNTI may include one or more information elements (e.g. one or more fields) defined in Table 4 below.

TABLE 4

| Fields (information elements) | Bits |
|---|---|
| Frequency domain resource assignment (FDRA) | variable |
| Time domain resource assignment (TDRA) | 4 |
| Virtual resource block (VRB)-to-Physical resource block (PRB) mapping | 1 |
| Modulation and coding scheme (MCS) | 5 |
| Redundancy version (RV) | 2 |
| System information indicator | 1 |
| Reserved | 15 |

In the first step (e.g. S510 in FIG. 5) of the initial access procedure, the terminal may determine a transmission power of the physical random access channel (PRACH) (e.g. first message, Msg1, MsgA) based on Equation 1 below.

$$P\_\mathrm{PRACH}=\min\{P\_C\mathrm{MAX},\mathrm{Preamble}\_Rx\_\mathrm{Target}\_\mathrm{Power}+PL\} \quad \text{[Equation 1]}$$

P_PRACH may be a transmission power of the PRACH in the terminal. P_CMAX may be the maximum transmission power of the PRACH. Preamble_Rx_Target_Power may be a target reception power of the PRACH expected by the base station. A path loss (PL) may be a path loss between the base station and the terminal. The terminal may estimate the path loss between the base station and the terminal based on an SS/PBCH block and/or a reference signal (e.g. channel state information-reference signal (CSI-RS)). Preamble_Rx_ Target_Power and/or P_CMAX may be configured to the terminal through signaling from the base station. Alternatively, Preamble_Rx_Target_Power and/or P_CMAX may be predefined in the technical specifications.

The terminal may calculate (Preamble_Rx_Target_Power+PL). When (Preamble_Rx_Target_Power+PL) is less than P_CMAX, the terminal may set (Preamble_Rx_Target_Power+PL) as P_PRACH. When (Preamble_Rx_Target_Power+PL) is equal to or greater than P_CMAX, the terminal may set P_CMAX as P_PRACH. The terminal may transmit the first message (e.g. Msg1 or MsgA) to the base station using P_PRACH.

In the second step (e.g. S520 in FIG. 5) of the initial access procedure, in order to transmit the second message (e.g. Msg2 or MsgB), the base station may transmit a DCI (e.g. DCI format 1_0) with a CRC scrambled by the RA-RNTI to the terminal on a PDCCH, and may transmit the second message to the terminal on a PDSCH scheduled by the DCI. The terminal may detect the DCI from the base station by using the RA-RNTI, and receive the second message from the base station on the PDSCH scheduled by the DCI. The DCI format 1_0 with the CRC scrambled by the RA-RNTI may include one or more information elements (e.g. one or more fields) defined in Table 5 below. Resource allocation information (e.g. FDRA and/or TDRA) included in the DCI format 1_0 may indicate the PDSCH (e.g. PDSCH resource, PDSCH region, PDSCH resource region) on which the second message is transmitted and received.

TABLE 5

| Fields (information elements) | Bits |
|---|---|
| FDRA | variable |
| TDRA | 4 |
| VRB-to-PRB mapping | 1 |
| MCS | 5 |
| Transport block (TB) scaling | 2 |
| Reserved | 16 |

In the fourth step (e.g. S540 in FIG. 5) of the initial access procedure, in order to transmit the fourth message (e.g. Msg4), the base station may transmit a DCI with a CRC scrambled by the TC-RNTI to the terminal on a PDCCH, and may transmit the fourth message to the terminal on a PDSCH scheduled by the DCI. The terminal may detect the DCI transmitted from the base station using the TC-RNTI and receive the fourth message from the base station on the PDSCH scheduled by the DCI.

Meanwhile, a power domain (PD) non-orthogonal multiple access (NOMA) technique may be introduced in the initial access procedure. The PD NOMA technique may be a technique for transmitting and receiving a plurality of signals (e.g. a plurality of data signals) using the same resource. In this case, the plurality of signals may overlap in the same resource. The PD NOMA technique may be referred to as a PD NOMA scheme. In the present disclosure, a NOMA scheme may be interpreted as the PD NOMA scheme depending on a context. The PD NOMA technique may be suitable for massive machine type communication (MMTC) and/or ultra-reliable and low-latency communication (URLLC). When the PD NOMA technique is used, a receiving node may receive overlapped signals in the same resource and decode each of the overlapped signals using a successive interference cancellation (SIC) method. For example, two terminals may transmit signals (e.g. data signals) in uplink communication using the PD NOMA technique. In this case, the overlapped signal r received at the base station may be defined as Equation 2 below.

$$r=h_1s_1+h_2s_2+n \quad \text{[Equation 2]}$$

r may be a reception signal (e.g. overlapped signal) at the base station. $s_1$ may be a signal (e.g. data signal, data symbol) transmitted by a first terminal. $s_2$ may be a signal (e.g. data signal, data symbol) transmitted by a second terminal. $h_1$ may denote radio channel coefficients between the first terminal and the base station. $h_2$ may denote radio channel coefficients between the second terminal and the base station. n may denote noise at the base station. It may be assumed that a difference exists between a power of $h_1$ (e.g. $|h_1|^2$) and a power of $h_2$ (e.g. $|h_2|^2$). When $|h_1|^2>|h_2|^2$, the base station may regard the first terminal as a near terminal (e.g. near user), and may regard the second terminal as a far terminal (e.g. far user). The base station may first decode data $s_1$ of the first terminal in the reception signal r, and obtain Equation 3 below by removing $h_1s_1$ from the reception signal r based on the decoding result of the data $s_1$.

$$r=h_2s_2+n \quad \text{[Equation 3]}$$

The base station may decode the signal $s_2$ of the second terminal based on Equation 3. Therefore, the base station may obtain each of the first terminal's data $s_1$ and the second terminal's data $s_2$. When $|h_1|^2<|h_2|^2$, the base station may regard the second terminal as a near terminal and may regard the first terminal as a far terminal. The base station may first decode the data $s_2$ of the second terminal in the received signal r, and remove $h_2s_2$ from the received signal r based on the decoding result of the data $s_2$, thereby decoding the data $s_1$ of the first terminal. If there is a difference in a radio channel power between two terminals, the NOMA technique (e.g. PD NOMA technique) may be applied.

In downlink communication, the base station may transmit signals (e.g. overlapped signals) for two terminals in the same resource. In this case, a reception signal at the first terminal may be defined as Equation 4 below, and a reception signal at the second terminal may be defined as Equation 5 below.

$$r_1=h_1(a_1s_1+a_2s_2)+n_1 \quad \text{[Equation 4]}$$

$$r_2=h_2(a_1s_1+a_2s_2)+n_2 \quad \text{[Equation 5]}$$

$r_1$ may be a reception signal at the first terminal. $r_2$ may be a reception signal at the second terminal. $s_1$ may be a signal of the first terminal (e.g. data transmitted from the base station to the first terminal). $s_2$ may be a signal of the second terminal (e.g. data transmitted from the base station to the second terminal). $a_1$ may denote a power allocation coefficient of the first terminal. $a_2$ may denote a power allocation coefficient of the second terminal. $h_1$ may denote radio channel coefficients between the first terminal and the base station. $h_2$ may denote radio channel coefficients between the second terminal and the base station. $n_1$ may be noise in the first terminal. $n_2$ may be noise in the second terminal.

A sum of $a_1$ and $a_2$ may be 1. It may be assumed that a difference exists between a power of $h_1$ (e.g. $|h_1|^2$) and a power of $h_2$ (e.g. $|h_2|^2$). When $|h_1|^2>|h_2|^2$, the first terminal, which is a near terminal, may first decode the data $s_2$ of the second terminal, which is a far terminal, from the reception signal $r_1$, and decode the data $1 of the first terminal by removing $h_2s_2$ from the reception signal $r_1$ based on the decoding result of the data $s_2$. The second terminal may immediately decode the data $s_2$ of the second terminal by considering the data $s_1$ of the first terminal as noise in the reception signal $r_2$.

When $|h_1|^2<|h_2|^2$, the second terminal, which is a near terminal, may first receive the data $s_1$ of the first terminal, which is a far terminal, from the reception signal $r_2$, and decode the data $s_2$ of the second terminal by removing $h_2s_1$ from the reception signal $r_2$ based on the decoding result of the data $s_1$. The first terminal may immediately decode the data $s_1$ of the first terminal by considering the data $s_2$ of the second terminal as noise in the reception signal $r_1$.

Meanwhile, in a communication network, a plurality of terminals may attempt the initial access procedures simultaneously. In this case, a collision between uplink signals/channels may occur. An uplink signal/channel may mean an uplink signal and/or an uplink channel. In the above-described situation, the initial access procedure may fail and the terminal's access may be delayed. Therefore, when a plurality of terminals attempt the initial access procedures simultaneously, methods for minimizing a failure of the initial access procedure are required.

To solve the collision problem between terminals in the initial access procedure (e.g. collision problem between signals/channels), an initial access procedure based on NOMA (e.g. PD NOMA) may be performed. If a NOMA-based initial access procedure is performed, the terminal's access delay may be reduced.

In the present disclosure, it may be assumed that the base station has capability of distinguishing the same first messages (e.g. Msg1 or MsgA) transmitted by a plurality of terminals. The same first messages may mean the first messages transmitted and received in the same RO. The RA-RNTI for the same first messages may be the same. The same first messages may have the same preamble sequence. The RAPID for the same first messages may be the same.

Two terminals may transmit the same first messages. For example, a first terminal may transmit a first message, a second terminal may transmit a first message, and the first message of the first terminal may be the same as the first message of the second terminal. If there is a difference at the base station between a reception time of the first message of the first terminal and a reception time of the first message of the second terminal, the base station may distinguish the same first messages of the two terminals based on the difference between reception times.

In order to distinguish the same first messages of a plurality of terminals, the preamble sequence may be improved. When the improved preamble sequence is used, the base station can easily distinguish the same first messages received from a plurality of terminals.

[Method 1: Method of Distinguishing Between a Near Terminal (e.g. Near User) and a Far Terminal (e.g. Far User) that Transmitted the Same First Messages (e.g. Msg1 or MsgA) in the Initial Access Procedure]

In the first step (e.g. S510 in FIG. 5) of the initial access procedure, each terminal may transmit the first message (e.g. Msg1 or MsgA). For example, two terminals (e.g. two or more terminals) may transmit the same first messages (e.g. first messages including the same preamble sequence) in the same RO. In this case, a problem of collision of the same first messages of two terminals may occur. In order to solve the collision problem, a method is needed to distinguish two terminals that transmitted the same first messages into a near terminal and a far terminal. The type (e.g. near terminal, far terminal) of the terminal that transmitted the same first message may be identified based on a transmission power of a PRACH (e.g. first message, Msg1, MsgB).

<Embodiment 1-1> Method of Distinguishing Between a Near Terminal and a Far Terminal Based on a Transmission Power of the Existing PRACH Each of the two terminals (e.g. first terminal and second terminal) may determine a PRACH transmission power based on Equation 1 described above. The two terminals may transmit the same first messages to the base station in the same RO. The base station may receive the first messages (e.g. the same first messages) from the two terminals in the same RO. In other words, the base station may receive a signal including the first messages of two terminals in the same RO. The base station may measure a reception power for the first message of each of the two terminals, and compare the measured reception power with a target reception power (e.g. Preamble_Rx_Target_Power). For example, the base station may identify whether the reception power of the first message is equal to the target reception power or less than the target reception power. The fact that the reception power of the first message is equal to the target reception power may mean that the reception power of the first message falls within a range of the target reception power.

If a difference between the reception power for the first message of the first terminal and the reception power of the first message of the second terminal is greater than or equal to a power threshold, the base station may determine that the first message having the target reception power was transmitted by a near terminal and determine that the first message having a reception power less than the target reception power was transmitted by a far terminal. The specific threshold may be set differently for each communication service, communication network, or base station. The base station may be aware of the specific threshold.

Based on Embodiment 1-1, the base station may distinguish terminals that transmitted the same first messages in the same RO into a near terminal and a far terminal. In the second step (e.g. S520 in FIG. 5) of the initial access procedure, the base station may generate a first RAR (e.g. second message, Msg2, MsgB) for the near terminal and a second RAR (e.g. second message, Msg2, MsgB) for the far terminal, transmit the first RAR to the near terminal, and transmit the second RAR to the far terminal. The two terminals may receive the RARs from the base station. In this case, each of the two terminals may receive (e.g. decode) the RAR (e.g. first RAR or second RAR) corresponding to its type (e.g. near terminal or far terminal) from the base station.

In the first step of the initial access procedure, a terminal that transmitted the first message using a transmission power less than the maximum transmission power P_CMAX may determine its type as a near terminal. For example, if a path loss between the terminal and the base station is small, the target reception power may be guaranteed at the base station. In this case, the terminal may transmit the first message using a transmission power less than the maximum transmission power P_CMAX. In the first step of the initial access procedure, a terminal that transmitted the first message using the maximum transmission power P_CMAX may determine its type as a far terminal. For example, if a path loss between the terminal and the base station is large, the target reception power may not be guaranteed at the base station. In this case, the terminal may transmit the first message using the maximum transmission power P_CMAX. Here, the base station may determine that a near terminal used a transmission power less than the maximum transmission power P_CMAX for transmission of the first message.

<Embodiment 1-2> Method of Distinguishing Between a Near Terminal and a Far Terminal Based on a Path Loss In the first step (e.g. S510 in FIG. 5) of the initial access procedure, PRACH transmission powers for all or some terminals may be set to be the same. The base station may receive the same first messages from two terminals (e.g. first terminal and second terminal) in the same RO, and measure reception powers for the same first messages. The base station may determine a type (e.g. near terminal or far terminal) of each of the first terminal and the second terminal based on a difference between the reception power for the first message of the first terminal and the reception power of the first message of the second terminal. For example, if the reception power for the first message of the first terminal is greater than the reception power for the first message of the second terminal, the base station may determine the first terminal to be a near terminal and determine the second terminal to be a far terminal. For another example, when the reception power for the first message of the first terminal is less than the reception power for the first message of the second terminal, the base station may determine the first terminal to be a far terminal and determine the second terminal to be a near terminal.

In the second step (e.g. S520 in FIG. 5) of the initial access procedure, the base station may generate a first RAR (e.g. second message, Msg2, MsgB) for the near terminal and a second RAR (e.g. second message, Msg2, MsgB) for the far terminal, transmit the first RAR to the near terminal, and transmit the second RAR to the far terminal. The two terminals may receive the RARs from the base station. In this case, each of the two terminals may receive the RAR (e.g. first RAR or second RAR) corresponding to its type (e.g. near terminal or far terminal) from the base station.

Each of the two terminals may measure a path loss between the terminal and the base station, compare the measured path loss and a reference path loss, and determine its type (e.g. near terminal or far terminal) based on the comparison result. For example, if the measured path loss is less than or equal to the reference path loss, the terminal may determine its type as a near terminal. If the measured path loss is greater than or greater than the reference path loss, the terminal may determine its type as a far terminal. The path loss may be measured based on an SSB, reference signal, and/or first message received from the base station. Information on the reference path loss may be included in the SIB1. The SIB1 may include information of one reference path loss.

Alternatively, the SIB1 may include information on a first reference path loss for determining a near terminal and information on a second reference path loss for determining a far terminal. If the measured path loss is less than or equal to the first reference path loss, the terminal may determine its type as a near terminal. If the measured path loss is greater than the second reference path loss, the terminal may determine its type as a far terminal. The reference path loss (e.g. first reference path loss, second reference path loss) may be set differently for each communication service, communication system, or base station.

[Method 2: Method of Transmitting and Receiving RAR(s) (e.g. Second Message, Msg2, MsgB) in the NOMA (e.g. PD NOMA)-Based Initial Access Procedure]

In the first step (e.g. S510 in FIG. 5) of the initial access procedure, the base station may receive the same first messages (e.g. Msg1 or MsgA) from two terminals in the same RO. In this case, the base station may distinguish each of the two terminals into a near terminal and a far terminal. In the second step (e.g. S520 in FIG. 5) of the initial access procedure, the base station may transmit RARs (e.g. Msg2 or MsgB) to the near terminal and the far terminal.

<Embodiment 2-1> The Base Station May Transmit One DCI Supporting NOMA to Two Terminals (e.g. Near Terminal and Far Terminal), and Transmit RARs to the Two Terminals on the Same PDSCH Scheduled by the One DCI Based on <Embodiment 1-1> or <Embodiment 1-2>, the base station may distinguish two terminals that transmitted the same first messages in the same RO into a near terminal and a far terminal. Each of the two terminals may determine its type as a near terminal or a far terminal based on <Embodiment 1-1> or <Embodiment 1-2>.

In the second step of the initial access procedure, in order to inform PDSCH-related information (e.g. scheduling information) for RAR (e.g. Msg2 or MsgB) reception for each of the near terminal and the far terminal, the base station may transmit a DCI (e.g. DCI format 1_0) with a CRC scrambled by the RA-RNTI to terminals (e.g. two terminals) on a PDCCH. To ensure that each of the near terminal and the far terminal can receive its RAR, the base station may generate the DCI format 1_0 including one or more information elements defined in Table 6 below and transmit the DCI format 1_0.

TABLE 6

| Fields (information elements) | Bits |
|---|---|
| FDRA | variable |
| TDRA | 4 |
| VRB-to-PRB mapping | 1 |
| MCS | 5 |
| TB scaling | 2 |
| NOMA indicator | 1 |
| Power allocation coefficient | 2 |
| Reserved | 13 |

In Table 6, the NOMA indicator may indicate whether the base station transmits an RAR for each of the near terminal and the far terminal. In other words, the NOMA indicator may indicate whether the second messages are transmitted based on the NOMA scheme. When the DCI including the NOMA indicator (e.g. NOMA indicator indicating that the second messages are transmitted based on the NOMA scheme) is received, the terminal may determine that a plurality of terminals transmitted the same first messages in the same RO. In this case (e.g. when the DCI including the NOMA indicator is received), the terminal may determine whether its type is a near terminal or a far terminal based on <Embodiment 1-1> or <Embodiment 1-2>.

The NOMA indicator set to a first value (e.g. 0) may indicate that the base station transmits an RAR for one terminal. In other words, when the NOMA indicator is set to the first value, the base station may transmit one RAR to one terminal without distinguishing between near and far terminals. When the NOMA indicator is set to the first value, the terminal may determine that an RAR is transmitted without using the NOMA scheme.

The NOMA indicator set to a second value (e.g. 1) may indicate that the base station transmits an RAR for each of the near terminal and the far terminal. In other words, when the NOMA indicator is set to the second value, the base station may transmit a first RAR for the near terminal and a second RAR for the far terminal. The first RAR and the second RAR may be distinguished. When the NOMA indicator is set to the second value, the terminal may determine that the RARs are transmitted based on the NOMA scheme.

When the NOMA indicator is set to the second value, the base station may transmit two RARs on one PDSCH (e.g. the same PDSCH) or partially overlapped PDSCHs based on the NOMA technique (e.g. PD NOMA technique). In this case, a reception signal at the first terminal may be expressed as Equation 4 above, and the first terminal may obtain the first RAR from the reception signal based on the description (e.g. decoding operation) related to Equation 4. A reception signal at the second terminal may be expressed as Equation 5 above, and the second terminal may obtain the second RAR from the reception signal based on the description (e.g. decoding operation) related to Equation 5.

When the NOMA indicator is set to the second value (e.g. when the NOMA-based RAR transmission operation is performed), the power allocation coefficient in Table 6 may indicate a power allocation coefficient (e.g. ratio of transmission power) used for PDSCH transmission (e.g. RAR transmission) for the near terminal. The power allocation coefficient of the near terminal may be defined as in Table 7 below. A power allocation coefficient used for PDSCH transmission (e.g. RAR transmission) for the far terminal may be (1—the power allocation coefficient defined in Table 7 below). The number of bits representing the power allocation coefficient may be set in various manners, and various ratios of transmission power may be indicated.

TABLE 7

| Power allocation coefficient (2 bits) | value |
|---|---|
| 00 | 0.1 |
| 01 | 0.2 |
| 10 | 0.3 |
| 11 | 0.4 |

The near terminal may first decode the second RAR of the far terminal using the information element(s) in Tables 6 and 7, and use the SCI method to remove the decoding result of the second RAR from the reception signal to obtain the first RAR. The far terminal may decode the second RAR using the information element(s) in Tables 6 and 7.

<Embodiment 2-2> The Base Station May Transmit Two DCIs Supporting NOMA to Two Terminals (e.g. Near Terminal and Far Terminal), and Transmit RARs to the Two Terminals on PDSCH(s) Scheduled by the Respective DCIs Based on <Embodiment 1-1> or <Embodiment 1-2>, the base station may distinguish two terminals that transmitted the same first messages (e.g. Msg1 or MsgA) in the same RO into a near terminal and a far terminals. Each of the two terminals may determine its type as a near terminal or a far terminal based on <Embodiment 1-1> or <Embodiment 1-2>.

In the second step of the initial access procedure, in order to inform the base station of PDSCH-related information (e.g. scheduling information) for RAR (e.g. second message, Msg2, MsgB) reception of each of the near terminal and the far terminal, the base station may transmit DCIs (e.g. DCI format 1_0) with a CRC scrambled by the RA-RNTI to the terminal on a PDCCH. The base station may transmit a first DCI to the near terminal and a second DCI to the far terminal. The first DCI and the second DCI may be distinguished from each other. A first PDSCH scheduled by the first DCI may be used for transmission of the first RAR of the near terminal. A second PDSCH scheduled by the second DCI may be used for transmission of the second RAR of the far terminal. The first PDSCH and the second PDSCH may be distinguished from each other. The first PDSCH and the second PDSCH may completely overlap or partially overlap. In <Embodiment 2-2>, the base station may generate the DCI format 1_0 (e.g. first DCI and second DCI) including one or more information elements defined in Table 8 below, and transmit the DCI format 1_0.

TABLE 8

| Field (information element) | Bits |
|---|---|
| FDRA | Variable |
| TDRA | 4 |
| VRB-to-PRB mapping | 1 |
| MCS | 5 |
| TB scaling | 2 |
| NOMA indicator | 1 |
| Near/far user indicator | 1 |
| Reserved | 14 |

In Table 8, the NOMA indicator may indicate whether the base station transmits an RAR for each of the near terminal and the far terminal. The NOMA indicator set to a first value (e.g. 0) may indicate that the base station transmits an RAR for one terminal. In other words, when the NOMA indicator is set to the first value, the base station may transmit one RAR without distinguishing between the near terminal and the far terminal. The NOMA indicator set to a second value (e.g. 1) may indicate that the base station transmits an RAR for each of the near terminal and the far terminal. In other words, when the NOMA indicator is set to the second value, the base station may transmit a first RAR for the near terminal and a second RAR for the far terminal. The first RAR and the second RAR may be distinguished.

In Table 8, the near/far user indicator may be used to distinguish between the near user (e.g. near terminal) and the far user (e.g. far terminal). The near/far user indicator may be referred to as ‘user indicator’ or ‘terminal indicator’. The near/far user indicator set to a first value (e.g. 0) may indicate the far terminal. The near/far user indicator set to a second value (e.g. 1) may indicate the near terminal. When the NOMA indicator is set to the second value and the near/far user indicator is set to the first value, the DCI including the NOMA indicator and the near/far user indicator may schedule the second PDSCH for transmission of the second RAR of the far terminal. Accordingly, the far terminal may determine the DCI including the NOMA indicator set to the second value and the near/far user indicator set to the first value as the DCI for scheduling transmission of its second RAR, and may receive the second RAR on the second PDSCH scheduled by the DCI.

When the NOMA indicator is set to the second value and the near/far user indicator is set to the second value, the DCI including the NOMA indicator and the near/far user indicator may schedule the first PDSCH for transmission of the first RAR of the near terminal. Accordingly, the near terminal may determine the DCI including the NOMA indicator set to the second value and the near/far user indicator set to the second value as the DCI for scheduling transmission of its first RAR, and receive the first RAR on the first PDSCH scheduled by the DCI.

<Embodiment 2-3> The Base Station May Transmit One DCI Supporting NOMA to Two Terminals (e.g. Near Terminal and Far Terminal), and Transmit RARs to the Terminals on a PDSCH and an Extended PDSCH Scheduled by One DCI, Respectively Based on <Embodiment 1-1> or <Embodiment 1-2>, the base station may distinguish two terminals that transmitted the same first messages (e.g. Msg1 or MsgA) in the same RO into a near terminal and a far terminal. Each of the two terminals may determine its type as a near terminal or a far terminal based on <Embodiment 1-1> or <Embodiment 1-2>.

In the second step of the initial access procedure, in order to inform the base station of PDSCH-related information (e.g. scheduling information) for RAR (e.g. second message, Msg2, MsgB) reception of each of the near terminal and the far terminal, the base station transmit a DCI (e.g. DCI format 1_0) with a CRC scrambled by the RA-RNTI to terminals (e.g. two terminals) on a PDCCH. To ensure that each of the near terminal and the far terminal can receive its RAR, the base station may generate the DCI format 1_0 including one or more information elements defined in Table 9 below, and transmit the DCI format 1_0.

TABLE 9

| Field (information element) | Bits |
|---|---|
| FDRA | Variable |
| TDRA | 4 |
| VRB-to-PRB mapping | 1 |
| MCS for a near user | 5 |
| MCS for a far user | 5 |
| TB scaling | 2 |
| NOMA indicator | 1 |
| Additional FDRA for a far user | 3 |
| Reserved | 7 |

In Table 9, the FDRA and TDRA may be common resource allocation information for the near terminal and the far terminal. In Table 9, the additional FDRA may be additional resource allocation information for the far terminal. The near terminal may perform a reception operation for an RAR (e.g. second message) using the common resource allocation information included in the DCI. The far terminal may perform a reception operation for an RAR (e.g. second message) using the common resource allocation information and the additional resource allocation information included in the DCI.

In <Embodiment 2-1>, the base station may transmit one DCI format 1_0 (e.g. the same DCI format 1_0) to the near terminal and the far terminal, and transmit RARs of the near terminal and the far terminal on the same PDSCH. In <Embodiment 2-2>, the base station may transmit two different DCI formats 1_0 to the near terminal and the far terminal, and transmit the RAR of the near terminal and the RAR for the far terminal on PDSCHs indicated by the two different DCI formats 1_0 (e.g. different PDSCHs, partially overlapped PDSCHs, fully overlapped PDSCHs).

Unlike <Embodiment 2-1> and <Embodiment 2-2>, in <Embodiment 2-3>, the base station may transmit one DCI format 1_0 (e.g. the same DCI format 1_0) for the near terminal and the far terminal, and transmit the RARs for the near terminal and the far terminal on different PDSCHs (e.g. PDSCH and extended PDSCH) indicated by the one DCI format 1_0, respectively. The PDSCH and the extended PDSCH may partially overlap. The extended PDSCH may be configured as follows.

Figure 6:
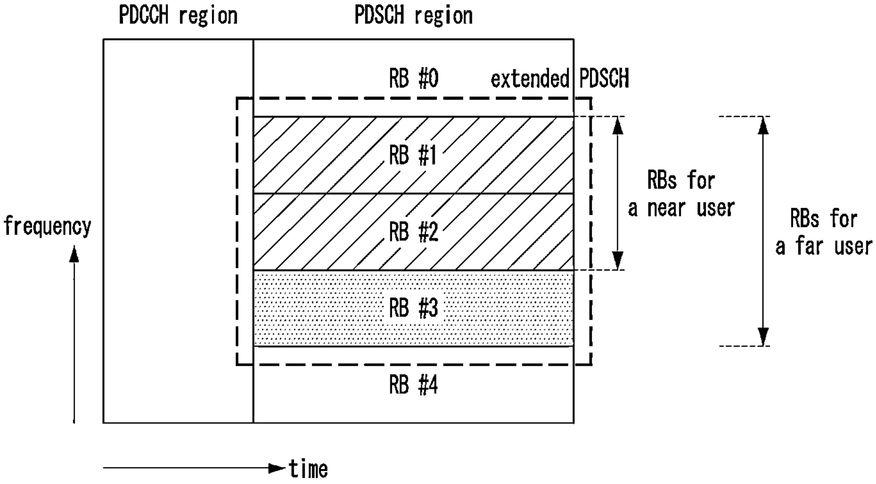
FIG. 6 is a conceptual diagram illustrating PDSCH regions for a near terminal and a far terminal.

FIG. 6 is a conceptual diagram illustrating PDSCH regions for a near terminal and a far terminal.

Referring to FIG. 6, the base station may allocate frequency resources (e.g. RB #1 and RB #2) for a near terminal, and allocate frequency resources (e.g. RB #1, RB #2, and RB #3) for a far terminal. The frequency resources for the near terminal may be located within the frequency resources for the far terminal. The frequency resources for the near terminal may be indicated by the FDRA defined in Table 9. The frequency resources for the far terminal may be indicated by the FDRA and the additional FDRA defined in Table 9. The FDRA may indicate the RB #1 and RB #2. The additional FDRA may indicate the RB #3.

Alternatively, the base station may allocate frequency resources (e.g. RB #1 and RB #2) for the far terminals and allocate frequency resources (e.g. RB #1, RB #2, and RB #3) for the near terminal. The frequency resources for the far terminal may be located within the frequency resources for the near terminal. The frequency resources for the far terminal may be indicated by the FDRA defined in Table 9. The frequency resources for the near terminal may be indicated by the FDRA and the additional FDRA defined in Table 9.

Meanwhile, a channel state (e.g. channel quality, channel conditions) between the near terminal and the base station may be different from that between the far terminal and the base station. In this case, an MCS for the near terminal and an MCS for the far terminal may be set independently (e.g. differently). The size of the PDSCH (e.g. PDSCH resource, PDSCH region) for RAR transmission of the near terminal may be different from the size of the PDSCH for RAR transmission of the far terminal. In this case, the MCS for the near terminal and the MCS for the far terminal may be set independently (e.g. differently). To support the above-described situation, as shown in Table 9, the DCI may include an MCS for the near user (e.g. near terminal) and an MCS for the far user (e.g. far terminal).

In Table 9, the NOMA indicator may indicate whether the base station transmits an RAR for each of the near terminal and the far terminal. The NOMA indicator set to a first value (e.g. 0) may indicate that the base station transmits an RAR for one terminal. In other words, when the NOMA indicator is set to the first value, the base station may transmit one RAR without distinguishing between the near terminal and the far terminal. The NOMA indicator set to a second value (e.g. 1) may indicate that the base station transmits an RAR for each of the near terminal and the far terminal. In other words, when the NOMA indicator is set to the second value, the base station may transmit a first RAR for the near terminal and transmit a second RAR for the far terminal. The first RAR and the second RAR may be distinguished.

When the NOMA indicator is set to the second value, the near terminal may identify a PDSCH (e.g. PDSCH region, PDSCH resource) based on the FDRA and TDRA defined in Table 9, and may identify the MCS for the near user (e.g. near terminal) defined in Table 9. The near terminal may perform a decoding operation to obtain the RAR based on the obtained information element(s) (e.g. information element(s) defined in Table 9).

When the NOMA indicator is set to the second value, the far terminal may identify a PDSCH (e.g. PDSCH region, PDSCH resource) of the near terminal based on the FDRA and the TDRA defined in Table 9, and may identify the additional frequency resources (e.g. RB(s)) added to the PDSCH (e.g. PDSCH region, PDSCH resource) for the far terminal based on the additional FDRA defined in Table 9. In other words, the far terminal may identify its extended PDSCH (e.g. PDSCH region, PDSCH resource) based on the FDRA, TDRA, and additional FDRA defined in Table 9. In addition, the far terminal may identify the MCS for the far user (e.g. far terminal) defined in Table 9. The far terminal may perform a decoding operation to obtain the RAR based on the acquired information element(s) (e.g. information element(s) defined in Table 9).

Alternatively, an additional TDRA may be used instead of the additional FDRA in Table 9. In other words, the DCI may include an information element (e.g. additional TDRA) indicating time resources added to the PDSCH (e.g. PDSCH region, PDSCH resource) of the far terminal. The additional time resources indicated by the additional TDRA may be located before or after the PDSCH region of the near terminal.

In the above-described exemplary embodiments, the number of bits of the DCI (e.g. information elements included in the DCI) may vary depending on a network environment (e.g. system environment). In the present disclosure, the initial access procedure (e.g. RA procedure) may be performed based on a combination of the above-described methods (e.g. a combination of the above-described exemplary embodiments), and the methods proposed in the present disclosure (e.g. Embodiments) may be applied to various communication networks (e.g. various communication systems) that support an initial access procedure (e.g. RA procedure).

The operations of the method according to the exemplary embodiment of the present disclosure can be implemented as a computer readable program or code in a computer readable recording medium. The computer readable recording medium may include all kinds of recording apparatus for storing data which can be read by a computer system. Furthermore, the computer readable recording medium may store and execute programs or codes which can be distributed in computer systems connected through a network and read through computers in a distributed manner.

The computer readable recording medium may include a hardware apparatus which is specifically configured to store and execute a program command, such as a ROM, RAM or flash memory. The program command may include not only machine language codes created by a compiler, but also high-level language codes which can be executed by a computer using an interpreter.

Although some aspects of the present disclosure have been described in the context of the apparatus, the aspects may indicate the corresponding descriptions according to the method, and the blocks or apparatus may correspond to the steps of the method or the features of the steps. Similarly, the aspects described in the context of the method may be expressed as the features of the corresponding blocks or items or the corresponding apparatus. Some or all of the steps of the method may be executed by (or using) a hardware apparatus such as a microprocessor, a programmable computer or an electronic circuit. In some embodiments, one or more of the most important steps of the method may be executed by such an apparatus.

In some exemplary embodiments, a programmable logic device such as a field-programmable gate array may be used to perform some or all of functions of the methods described herein. In some exemplary embodiments, the field-programmable gate array may be operated with a microprocessor to perform one of the methods described herein. In general, the methods are preferably performed by a certain hardware device.

The description of the disclosure is merely exemplary in nature and, thus, variations that do not depart from the substance of the disclosure are intended to be within the scope of the disclosure. Such variations are not to be regarded as a departure from the spirit and scope of the disclosure. Thus, it will be understood by those of ordinary skill in the art that various changes in form and details may be made without departing from the spirit and scope as defined by the following claims.

What is claimed is:

1. A method of a base station, comprising:
- receiving a signal including a first message of a first terminal and a first message of a second terminal in one random access channel (RACH) occasion (RO);
- determining the first terminal as a near terminal based on preconfigured criteria;
- determining the second terminal as a far terminal based on the preconfigured criteria;
- transmitting, to the first terminal and the second terminal, one or more downlink control information (DCIs) including a non-orthogonal multiple access (NOMA) indicator indicating that second messages, which are responses to the first messages of the first terminal and the second terminal, are to be respectively transmitted in a NOMA scheme; and
- transmitting the second messages to the first terminal and the second terminal based on the one or more DCIs,
- wherein the NOMA indicator is set to a first value or a second value,
- wherein, based on the NOMA indicator being set to the first value, the NOMA indicator indicates that a second message for one of the first terminal or the second terminal is to be transmitted, and
- wherein, based on the NOMA indicator being set to the second value, the NOMA indicator indicates that second messages for the first terminal and the second terminal are to be transmitted based on the NOMA scheme.

2. The method according to claim 1, wherein when a first reception power of the first message of the first terminal is equal to a target reception power, the first terminal is determined as the near terminal, and when a second reception power of the first message of the second terminal is less than the target reception power, the second terminal is determined as the far terminal.

3. The method according to claim 1, wherein when a same transmission power is configured for the first messages of the first terminal and the second terminal, and a first reception power of the first message of the first terminal is greater than a second reception power of the first message of the second terminal, the first terminal is determined as the near terminal, and the second terminal is determined as the far terminal.

4. The method according to claim 1, wherein a number of the one or more DCIs is 1, and one DCI belonging to the one or more DCIs further includes resource allocation information and a power allocation coefficient for transmission of the second message based on the NOMA scheme.

5. The method according to claim 4, wherein the transmitting of the second messages to the first terminal and the second terminal based on the one or more DCIs comprises:
- transmitting, to the first terminal, the second message using a first transmission power determined based on a value indicated by the power allocation coefficient on a physical downlink shared channel (PDSCH) indicated by the resource allocation information included in the one DCI; and
- transmitting, to the second terminal, the second message using a second transmission power determined based on (1−the value indicated by the power allocation coefficient) on the PDSCH indicated by the resource allocation information included in the one DCI.

6. The method according to claim 1, wherein a number of the one or more DCIs is 2, a first DCI among the one or more DCIs further includes first resource allocation information and a terminal indicator indicating the near terminal, and a second DCI among the one or more DCIs further includes second resource allocation information and a terminal indicator indicating the far terminal.

7. The method according to claim 6, wherein the transmitting of the second messages to the first terminal and the second terminal based on the one or more DCIs comprises:
- transmitting the second message to the first terminal on a first PDSCH indicated by the first resource allocation information included in the first DCI; and
- transmitting the second message to the second terminal on a second PDSCH indicated by the second resource allocation information included in the second DCI.

8. The method according to claim 1, wherein a number of the one or more DCIs is 1, and one DCI belonging to the one or more DCIs further includes common resource allocation information for the near terminal and the far terminal and additional resource allocation information for the far terminal.

9. The method according to claim 8, wherein the one DCI further includes first modulation and coding scheme (MCS) information for the near terminal and second MCS information for the far terminal.

10. The method according to claim 8, wherein the transmitting of the second messages to the first terminal and the second terminal based on the one or more DCIs comprises:
- transmitting the second message to the first terminal on a first PDSCH indicated by the common resource allocation information included in the one DCI; and
- transmitting the second message to the second terminal on a second PDSCH indicated by the common resource allocation information and the additional resource allocation information included in the one DCI.

11. The method according to claim 1, wherein the first message of each of the first terminal and the second terminal is a Msg1 or MsgA, and the second message is a Msg2 or MsgB.

12. A method of a first terminal, comprising:
- transmitting a first message to a base station in a random access channel (RACH) occasion (RO);
- receiving, from the base station, one or more downlink control information (DCIs) for scheduling a second message, which is a response to the first message;
- in response to that the one or more DCIs include a non-orthogonal multiple access (NOMA) indicator indicating that a second message is to be transmitted based on a NOMA scheme, determining a type of the first terminal as a near terminal or a far terminal based on preconfigured criteria; and receiving the second message from the base station based on the determined type, wherein the NOMA indicator is set to a first value or a second value, wherein, based on the NOMA indicator being set to the first value, the NOMA indicator indicates that a second message for one of the first terminal or a second terminal is to be transmitted, and wherein, based on the NOMA indicator being set to the second value, the NOMA indicator indicates that second messages for the first terminal and the second terminal are to be transmitted based on the NOMA scheme.

13. The method according to claim 12, wherein when the first message is transmitted using a transmission power less than a maximum transmission power, the first terminal is determined as the near terminal, and when the first message is transmitted using a transmission power equal to the maximum transmission power, the first terminal is determined as the far terminal.

14. The method according to claim 12, wherein when a path loss between the first terminal and the base station is less than or equal to a reference path loss, the first terminal is determined as the near terminal, and when the path loss between the first terminal and the base station is greater than the reference path loss, the first terminal is determined as the far terminal.

15. The method according to claim 12, wherein a number of the one or more DCIs is 1, one DCI belonging to the one or more DCIs further includes resource allocation information and a power allocation coefficient for transmission of the second message based on the NOMA scheme, the second message is received on a physical downlink shared channel (PDSCH) indicated by the resource allocation information, and the second message is decoded in consideration of the power allocation coefficient.

16. The method according to claim 12, wherein a number of the one or more DCIs is 2, a first DCI among the one or more DCIs further includes first resource allocation information and a terminal indicator indicating the near terminal, a second DCI among the one or more DCIs further includes second resource allocation information and a terminal indicator indicating the far terminal, and the second message is received based on a DCI corresponding to the determined type among the first DCI and the second DCI.

17. The method according to claim 12, wherein a number of the one or more DCIs is 1, one DCI belonging to the one or more DCIs further includes common resource allocation information for the near terminal and the far terminal and additional resource allocation information for the far terminal, the second message is received on a first PDSCH indicated by the common resource allocation information when the first terminal is the near terminal, and the second message is received on a second PDSCH indicated by the common resource allocation information and the additional resource allocation information when the first terminal is the far terminal.

18. A first terminal comprising at least one processor, wherein the at least one processor causes the first terminal to perform:

transmitting a first message to a base station in a random access channel (RACH) occasion (RO);

receiving, from the base station, one or more downlink control information (DCIs) for scheduling a second message, which is a response to the first message;

in response to that the one or more DCIs include a non-orthogonal multiple access (NOMA) indicator indicating that the second message is to be transmitted based on a NOMA scheme, determining a type of the first terminal as a near terminal or a far terminal based on preconfigured criteria; and receiving the second message from the base station based on the determined type, wherein the NOMA indicator is set to a first value or a second value, wherein, based on the NOMA indicator being set to the first value, the NOMA indicator indicates that a second message for one of the first terminal or a second terminal is to be transmitted, and wherein, based on the NOMA indicator being set to the second value, the NOMA indicator indicates that second messages for the first terminal and the second terminal are to be transmitted based on the NOMA scheme.

19. The first terminal according to claim 18, wherein when the first message is transmitted using a transmission power less than a maximum transmission power, the first terminal is determined as the near terminal, and when the first message is transmitted using a transmission power equal to the maximum transmission power, the first terminal is determined as the far terminal.

20. The first terminal according to claim 18, wherein a number of the one or more DCIs is 1, one DCI belonging to the one or more DCIs further includes resource allocation information and a power allocation coefficient for transmission of the second message based on the NOMA scheme, the second message is received on a physical downlink shared channel (PDSCH) indicated by the resource allocation information, and the second message is decoded in consideration of the power allocation coefficient.

* * * * *